United States Patent
Begleiter

[15] 3,692,071
[45] Sept. 19, 1972

[54] NOZZLE FOR INFLATING BALLOONS
[72] Inventor: Manny Begleiter, Bronx, N.Y. 10468
[73] Assignee: Miner Industries Inc., New York, N.Y.
[22] Filed: Jan. 15, 1971
[21] Appl. No.: 106,662

[52] U.S. Cl. ............141/313, 137/525, 137/512.3
[51] Int. Cl. ..........................................F17c 13/00
[58] Field of Search.................9/314–316; 46/87, 46/90; 137/512.4, 513.3, 525, 512.3; 138/93; 141/4, 144, 311, 313, 314, 316, 317, 287, 383, 392; 285/97, 107, 109

[56] References Cited

UNITED STATES PATENTS

| | | | |
|---|---|---|---|
| 3,174,455 | 3/1965 | Peterson | 46/90 X |
| 1,631,584 | 6/1927 | Dietrich et al. | 141/383 X |
| 1,689,360 | 10/1928 | Monnot | 141/311 X |
| 3,351,105 | 11/1967 | Di Perna | 141/311 X |
| 576,945 | 2/1897 | Brenneman | 285/107 |

Primary Examiner—Edward J. Earls
Attorney—Lewis H. Eslinger, Alvin Sinderbrand and Curtis, Morris & Safford

[57] ABSTRACT

An elastic balloon mounted on a hollow valve body which projects from the mouth of the balloon neck and is open axially only at its open end, with radial passages in the valve body being normally sealed by elastic engagement of the balloon neck therearound, is inflated with gas under pressure supplied to the interior of the valve body through a nozzle structure engaged by the valve body and functioning to prevent the escape of such gas from the valve body except into the balloon. The nozzle structure comprises a core member dimensioned to extend into the valve body and having bores for the passage of the inflating gas therethrough and a frusto-conical surface for sealing engagement by the valve body at its open end, and an annular member extending around, and spaced from the core member and having an inner surface for engagement with the thickened rim at the mouth of the balloon neck.

3 Claims, 5 Drawing Figures

PATENTED SEP 19 1972 3,692,071

INVENTOR
MANNY BEGLEITER
BY
*Alvin Sinderband*
ATTORNEY

NOZZLE FOR INFLATING BALLOONS

This invention relates generally to balloon inflating devices, and more particularly is directed to devices for inflating balloons which have a valve situated in the balloon neck to retain an inflating gas in the balloon after such gas has been supplied to the balloon through the valve.

As disclosed generally in German Pat. No. 488,336, issued Jan. 6, 1930, and more particularly as disclosed in U.S. Pat. No. 3,616,569, issued Nov. 2, 1971, on application, Ser. No. 837,691, filed June 30, 1969, in the names of Donald D. Litt and David B. Jaroff, and having a common assignee herewith, a balloon valve as aforesaid may consist of a hollow, cylindrical body engaged elastically by the balloon neck and opening axially only at one end which projects from the mouth of the balloon neck with radial passages in the valve body being normally sealed by the balloon neck engaging elastically therearound. When an inflating gas under pressure, such as helium, is supplied to the interior of the valve body through a nozzle engaging in the open end of the latter, the gas acts outwardly through the radial passages to distend the adjacent region of the balloon neck away from the valve body and to permit the gas to pass into the balloon for inflating the latter. When the supplying of gas is halted, the balloon neck again elastically engages the valve body at the radial passages of the latter for sealing the inflating gas within the balloon.

When inflating a balloon as described above, it is difficult to avoid leakage of the inflating gas between the nozzle and valve body and between the valve body and the mouth of the balloon neck. The probability of such leakage is increased as the pressure of the inflating gas is increased to shorten the time required for inflation of a balloon. When the inflating gas is helium so as to make the inflated balloon buoyant in the air, the relatively high cost of helium makes the avoidance of leakage thereof an obviously desirable condition for balloon inflation.

Accordingly, it is an object of this invention to provide a nozzle structure through which a balloon mounted on a valve, as aforesaid, may be inflated without the danger of leakage of the inflating gas to the atmosphere, even when such gas is supplied to the nozzle at a relatively high pressure to permit rapid inflation of the balloon.

Another object is to provide a nozzle structure by which separation of the balloon from the valve body is avoided during inflation of the balloon with gas under pressure supplied to the nozzle.

In accordance with an aspect of this invention, a nozzle structure for inflating an elastic balloon mounted on a valve body, as described above, comprises a core member supported at one end and dimensioned at its other end portion to extend with clearance into the open end of the valve body, such core member having bores therein for receiving an inflating gas at its supported end and opening at the other end portion for discharging the gas from the core member into the valve body, the core member further having means thereon defining a frusto-conical surface adjacent said other end portion and tapering in the direction toward the latter for sealing engagement with the open end of the valve body, and an annular member extending around, and spaced radially from said other end portion of the core member and having an inner surface for engagement with the usual thickened rim at the mouth of the balloon when the open end of the respective valve body is in sealing engagement with the mentioned frusto-conical surface on the core member. Thus, leakage of the inflating gas between the core member and the valve body is avoided by the sealing engagement of the open end of the valve body with the frusto-conical surface on the core member. Further, by reason of the engagement of the inner surface of the annular member with the thickened rim at the mouth of the balloon neck, such mouth is held in sealing engagement with the outer surface of the valve body to prevent the leakage of inflating gas therebetween, and also to prevent separation of the balloon from the valve body during inflation of the balloon.

In a preferred embodiment of the invention, the frusto-conical surface on the core member is defined by a frusto-conical part of the core member adjacent the end portion of the latter which extends into the valve body, and an elastomeric sealing sleeve extending around at least the frusto-conical part of the core member and elastically conforming to the surface thereof for engagement by the open end of the valve body. Further, it is preferred that the bores in the core member include an axial bore to receive the inflating gas from a source or supply thereof and radial bores extending from the axial bore and having openings at a peripheral surface of the end portion of the core member which extends into the valve body, and the sealing sleeve preferably extends from the frusto-conical part of the core member over the openings of the radial bores so that, when the inflating gas under pressure is supplied to the bores of the core member, the gas acts at the radial bores to distend the sealing sleeve away from the adjacent peripheral surface of the core member and into sealing engagement with the inner surface of the valve body engaging on said core member.

The above, and other objects, features and advantages of the invention, will be apparent in the following detailed description of an illustrative embodiment thereof which is to be read in connection with the accompanying drawing, wherein.

Figure 1:
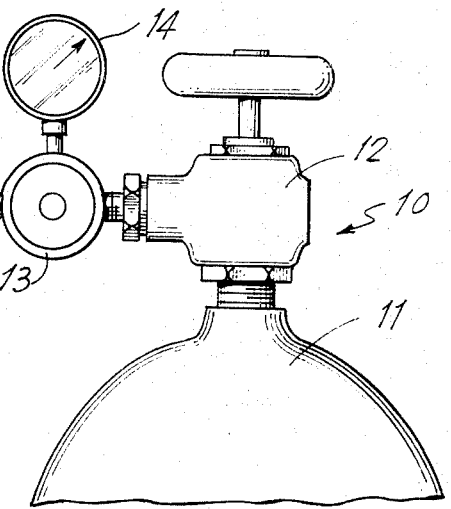
FIG. 1 is a side elevational view of a balloon inflating device provided with a nozzle structure in accordance with this invention.

Referring to the drawings in detail, and initially to FIG. 1 thereof, it will be seen that a device 10 for inflating balloons may comprise a tank 11 containing a supply of helium or other inflating gas under pressure, and having the usual manually operable shut-off valve 12 connected with its outlet. A commercially available pressure regulator 13 is connected with shut-off valve 12 and has a pressure gauge 14 associated therewith. Extending from the pressure regulator 13 is a manually controlled dispensing valve 15 which may be of the type available commercially under the designation Blowgun No. 220, from Diamond U Products, and which is opened by manual depression of a push-button 16 to permit the flow through valve 15 of the inflating gas under pressure to a nozzle structure 17 according to this invention which is mounted directly on valve 15.

Figure 2:
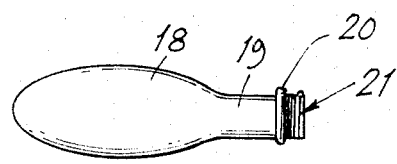
FIG. 2 is an elevational view of an uninflated elastic balloon mounted on a valve body so as to be inflatable through the nozzle structure according to this invention.

The nozzle structure 17 according to this invention is intended for use in inflating an elastic balloon 18 which, as shown on FIG. 2, has the usual neck 19 with a thickened rim 20 at the open mouth thereof and which engages elastically about a valve 21 cooperating with the balloon neck 19 to seal inflating gases within the balloon 18 after the latter has been inflated by the inflating gases supplied thereto through valve 21.

Figure 4:
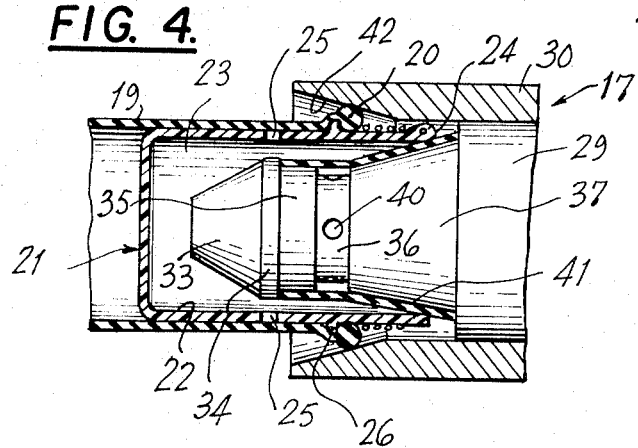
FIG. 4 is a view similar to that of FIG. 3, but showing the nozzle structure engaged by a valve body having an elastic balloon mounted thereon.
Figure 5:
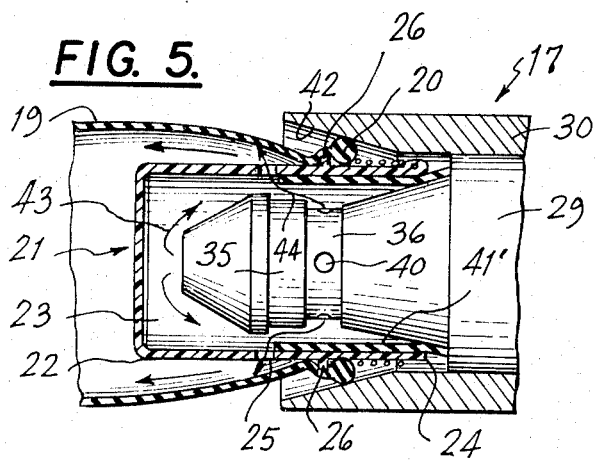
FIG. 5 is a view similar to that of FIG. 4, but showing the conditions of the nozzle structure, valve body and balloon during inflation of the latter with a gas under pressure supplied to the nozzle structure.

The valve 21 is shown on FIGS. 4 and 5 to be of the type disclosed in detail in the application for U.S. Pat. Ser. No. 837,691 identified more fully above, and consists of a generally cylindrical, hollow body 22 molded or otherwise formed of a suitable plastic material and having an axial bore 23 which opens at only one end 24 of the valve body. Radial passages 25 extend from bore 23 to openings at the outer surface of valve body 22. A continuous or interrupted annular, external shoulder 26 is directed radially outward on valve body 22 between the openings of radial passages 25 and the open end 24 of the valve body. The outer surface of valve body 22, at least between shoulder 26 and the closed end of the valve body, is diametrically dimensioned so as to be substantially wider than the relaxes or molded diameter of the neck 19 of balloon 18. Thus, when valve body 22 is extended, at its closed end, into the mouth of balloon 18 to an extend sufficient to engage the thickened rim 20 of the balloon over shoulder 26, the balloon neck 19 is stretched around the outer surface of valve body 22 to normally tightly seat thereagainst and thereby seal the openings at the outer ends of radial passages 25, as shown on FIG. 4.

As is shown on FIG. 5, when an inflating gas under pressure is supplied to the interior or bore 23 of valve body 22, such gas acts radially outward through passages 25 to distend or deflect balloon neck 19 away from the outer surface of valve body 22 and thereby permit the flow of the gas under pressure into the balloon 18 for inflating the latter.

Figure 3:
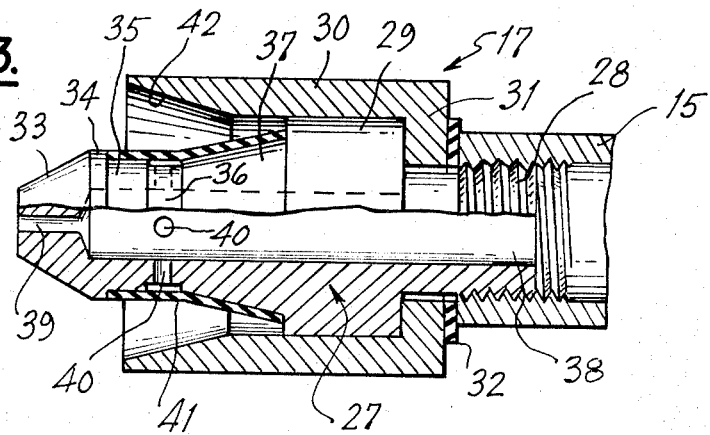
FIG. 3 is an enlarged, axial sectional view through a nozzle structure in accordance with an embodiment of this invention.

As shown on FIG. 3, the nozzle structure 17 according to this invention for use in inflating a balloon 18 mounted on a valve 21, as described above, comprises a core member 27 which, at one end, is formed with a threaded nipple 28 screwed into a threaded end of the manually controlled valve 15 for supporting the nozzle structure 17 from valve 15. Intermediate its ends, core member 27 is formed with a cylindrical enlargement 29 which supports an annular member 30 having an inwardly directed flange 31 at one end which extends around nipple 28. In assembling nozzle structure 17 with valve 15, a sealing washer 32 is provided around nipple 28 between flange 31 and the adjacent end surface of valve 15 with flange 31 and washer 32 being clamped between enlargement 29 and the end surface of valve 15 for positioning annular member 30 relative to core member 27.

The end portion of core member 27 remote from nipple 28 is shown to include a tapered nose 33 which extends to a narrow cylindrical surface portion 34. Adjacent surface portion 34, core member 27 is formed with a recessed cylindrical seat 35 which is followed, in the axial direction away from nose 33, by a circumferential groove 36. Between groove 36 and cylindrical enlargement 29, core member 27 is formed with a frusto-conical part 37 which tapers in the direction toward nose 33. Core member 27 is further shown to have an axial bore 38 which opens through the nipple 28 to receive inflating gas from valve 15, and which terminates in an axial passage 39 opening at the end face of nose 33. Further, radial bores 40 extend from axial bore 38 and open outwardly within circumferential groove 36.

An elastomeric sleeve 41, which is molded or otherwise formed so as to be of cylindrical configuration, is elastically stretched around frusto-conical part 37 of the core member, and preferably extends from frusto-conical part 37 across groove 36 and onto the recessed cylindrical seat 35.

As shown particularly on FIG. 4, the end portion of core member 27 remote from nipple 28 is dimensioned to extend with clearance into open end 24 of valve body 22, and further to space the nose 33 axially away from the closed end of valve body 22 when open end 24 of the valve body is in sealing engagement with the portion of sealing sleeve 41 on the tapering surface of frusto-conical part 37. The annular member 30 preferably has an inner surface 42 which is tapered to increase in diameter in the axial direction toward the nose 33 of the core member, and such inner surface 42 of member 30 is spaced radially outward from the adjacent end portion of core member 27 for engagement with the thickened rim 20 of balloon neck 19 when open end 24 of the respective valve body is in sealing engagement with sealing sleeve 41 (FIGS. 4 and 5). Further, as shown, the taper or slope of frusto-conical part 37 of the core member is selected so that, when the open end 24 of the valve body 22 is in sealing engagement with sleeve 41, radial passages 25 of the valve body will be clear of the end of sleeve 41 resting on the recessed seat 35, that is displaced from seat 35 in the axial direction toward nose 33.

In using the nozzle structure 17 to inflate a balloon 18, the neck 19 of the latter mounted on the valve 21 is manually grasped and pressed axially into the nozzle structure to the position shown on FIG. 4. When helium or another inflating gas under pressure is supplied to bore 38 of core member 27, for example, by way of the manually controlled valve 15, the inflating gas enters the interior of valve body 22 through axial passage 39, as indicated by the arrows 43 on FIG. 5. The inflating gas also exits from bore 38 through radial bores 40 and acts radially outward in groove 36 to distend the sleeve 41 away from recessed cylindrical seat 35 and groove 36, as indicated at 41' on FIG. 5, and into sealing engagement with the inner surface of valve body 22. By reason of such distending of sealing sleeve 41, the inflating gas is also free to travel from radial bores 40 between distended sleeve 41' and seat 35 and to act outwardly at the radial passages 25 of the valve body, as indicated by the arrows 44. Thus, the inflating gas under pressure issuing from core member 27 through axial passage 39 and radial bores 40 enters the interior of valve body 22 and acts at radial passages 25 thereof to deflect the neck 19 of the balloon away from the outer surface of valve body 22 and thereby permit such inflating gas to enter the balloon.

It will be seen that, by reason of the engagement of the tapered inner surface 42 of annular member 30 with the thickened rim 20 at the mouth of balloon neck 19, the inflating gas under pressure acting radially outward through radial passages 25 of the valve body 22 cannot escape between valve body 22 and neck 19 in the direction toward rim 20, and therefore can only travel axially in the direction toward the main body or portion of balloon 18. The engagement of surface 42 with rim 20 also maintains engagement of the latter with shoulder 26 to prevent separation of balloon 18 from valve 21. Further, the engagement of the open end 24 of valve body 22 with sealing sleeve 41 ensures that the latter will be maintained in tight sealing engagement with the surface of frusto-conical part 37 extending from the line of contact of valve body end 24 with the sleeve to the end of the latter adjacent cylindrical enlargement 29, thereby to prevent leakage of the inflating gas between sleeve 41 and frusto-conical part 37. Since the inflating gas escaping radially outward through bores 40 urges the adjacent portion of sleeve 41 against the inner surface of valve body 22, as at 41' on FIg. 5, a seal is provided between the inner surface of valve body 22 and the portion of sleeve 41 in contact therewith so as to securely avoid the leakage of the inflating gas to the atmosphere between sleeve 41 and the inner surface of valve body 22. Accordingly, all of the inflating gas admitted to core member 27 is utilized for inflating the balloon and there is no waste of the inflating gas, which is of commercial importance when the inflating gas consists of relatively costly helium.

By reason of the effectiveness of nozzle structure 17 in preventing the leakage of inflating gas to the atmosphere and in preventing separation of the balloon from its valve during inflation, such inflation can be effected with a gas under relatively high pressure to shorten the time required for inflation.

After a balloon has been inflated to the desired extent, the supplying of inflating gas to nozzle structure 17 is halted, for example, by releasing the push button 16 of valve 15, whereupon balloon neck 19 returns to its normal position in elastic engagement with the outer surface of valve body 22 for sealing radial passages 25 and thereby retaining the inflating gas within the balloon, as shown on FIG. 4. The inflated balloon and its respective valve 21 may then be simply axially removed from nozzle structure 17.

Although an illustrative embodiment of a nozzle structure according to this invention has been described in detail herein with reference to the accompanying drawing, it is to be understood that the invention is not limited to that precise embodiment, and that various changes and modifications may be effected therein by one skilled in the art without departing from the scope or spirit of the invention.

What is claimed is:

1. A nozzle structure for use in inflating an elastic balloon having a neck with a thickened rim at the open mouth thereof and which engages elastically about a generally cylindrical hollow valve body that projects at one end from said mouth of the ballon neck and is open axially only at said one end with radial passages in the valve body being normally sealed by the elastic engagement of the balloon neck therearound; said nozzle structure comprising a core member supported at one end and dimensioned at its other end portion to extend with clearance into said one open end of the valve body, said core member having a frusto-conical part disposed adjacent said other end portion and tapering in the direction toward the latter, an elastomeric sealing sleeve extending around at least said frusto-conical part and elastically conforming to the surface of the latter for sealing engagement with the open end of the valve body when said other end portion of the core member extends into the valve body, said core member further having an axial bore for receiving an inflating gas under pressure at said one end of the core member and radial bores extending from said axial bore and having openings at a peripheral surface of said other end portion of the core member onto which said sleeve extend, for normally covering said radial bores, so that, when the inflating gas under pressure is supplied to said axial bore, the gas acts at said radial bores to distend said sleeve away from said peripheral surface of said other end portion and into sealing engagement with the inner surface of a valve body on said core member which valve body is supplied with the gas from said radial bores, and an annular member extending around, and spaced radially from said other end portion of the core member and having an inner surface for engagement with the thickened rim of a balloon when the open end of the respective valve body is in sealing engagement with said sealing sleeve on said frusto-conical part of the core member.

2. A nozzle structure according to claim 1, in which said inner surface of the annular member is tapered to increase in diameter in the axial direction toward said other end of the core member.

3. A nozzle structure according to claim 1, in which said axial bore also opens axially at said other end of the core member.

* * * * *